(12) United States Patent
Silverstein et al.

(10) Patent No.: US 10,498,960 B2
(45) Date of Patent: Dec. 3, 2019

(54) MODELESS VIDEO AND STILL FRAME CAPTURE

(71) Applicant: Apple Inc., Cupertino, CA (US)

(72) Inventors: D. Amnon Silverstein, Palo Alto, CA (US); Shun Wai Go, Cupertino, CA (US); Suk Hwan Lim, Mountain View, CA (US); Timothy J. Millet, Mountain View, CA (US); Ting Chen, Cupertino, CA (US); Bin Ni, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/019,906

(22) Filed: Jun. 27, 2018

(65) Prior Publication Data

US 2018/0324357 A1 Nov. 8, 2018

Related U.S. Application Data

(60) Continuation of application No. 15/414,866, filed on Jan. 25, 2017, now Pat. No. 10,038,845, which is a
(Continued)

(51) Int. Cl.
*H04N 5/225* (2006.01)
*H04N 5/232* (2006.01)
(Continued)

(52) U.S. Cl.
CPC ......... *H04N 5/23245* (2013.01); *H04N 1/212* (2013.01); *H04N 5/23216* (2013.01);
(Continued)

(58) Field of Classification Search
CPC ..... H04N 5/23245; H04N 5/343; H04N 1/212
(Continued)

(56) References Cited

U.S. PATENT DOCUMENTS 7,110,025 B1 9/2006 Loui et al.
7,705,889 B2 4/2010 Tabatabai et al.
(Continued)

FOREIGN PATENT DOCUMENTS

CN 102124727 A 7/2011
CN 102629972 A 8/2012
(Continued)

OTHER PUBLICATIONS

International Search Report and Written Opinion from PCT/US2014/057599, dated Dec. 8, 2014, Apple Inc., pp. 1-12.
(Continued)

*Primary Examiner* — Usman A Khan
(74) *Attorney, Agent, or Firm* — Kowert, Hood, Munyon, Rankin & Goetzel, P.C.; Lawrence J. Merkel

(57) ABSTRACT

In an embodiment, an electronic device may be configured to capture still frames during video capture but may capture the still frames in the 4×3 aspect ratio and at higher resolution than the 16×9 aspect ratio video frames. The device may interleave high resolution, 4×3 frames and lower resolution 16×9 frames in the video sequence, and may capture the nearest higher resolution, 4×3 frame when the user indicates the capture of a still frame. Alternatively, the device may display 16×9 frames in the video sequence, and then expand to 4×3 frames when a shutter button is pressed. The device may capture the still frame and return to the 16×9 video frames responsive to a release of the shutter button.

20 Claims, 7 Drawing Sheets

Related U.S. Application Data continuation of application No. 15/089,784, filed on Apr. 4, 2016, now Pat. No. 9,591,219, which is a division of application No. 14/082,390, filed on Nov. 18, 2013, now Pat. No. 9,344,626.

(51) Int. Cl.
  *H04N 7/01* (2006.01)
  *H04N 9/87* (2006.01)
  *H04N 1/21* (2006.01)

(52) U.S. Cl.
  CPC ..... *H04N 5/23232* (2013.01); *H04N 5/23293* (2013.01); *H04N 7/0122* (2013.01); *H04N 9/87* (2013.01)

(58) Field of Classification Search
  USPC ............. 348/220.1, 333.11, 445; 715/760
  See application file for complete search history.

(56) References Cited

U.S. PATENT DOCUMENTS

| | | | |
|---|---|---|---|
| 9,344,626 | B2 | 5/2016 | Silverstein et al. |
| 9,591,219 | B2 | 3/2017 | Silverstein et al. |
| 10,038,845 | B2 | 7/2018 | Silverstein et al. |
| 2003/0147640 | A1 | 8/2003 | Voss et al. |
| 2006/0165179 | A1 | 7/2006 | Feuer et al. |
| 2010/0062803 | A1 | 3/2010 | Yun |
| 2010/0253814 | A1 | 10/2010 | Sakamoto et al. |
| 2010/0295966 | A1 | 11/2010 | Furlan |
| 2013/0155265 | A1 | 6/2013 | Bae |
| 2013/0271621 | A1* | 10/2013 | Lee ............ H04N 5/232 348/222.1 |
| 2014/0139736 | A1 | 5/2014 | McCoy |
| 2014/0337723 | A1 | 11/2014 | Van Tol et al. |
| 2016/0219220 | A1 | 7/2016 | Silverstein et al. |
| 2017/0134655 | A1 | 5/2017 | Silverstein et al. |

FOREIGN PATENT DOCUMENTS

| | | |
|---|---|---|
| CN | 102752640 A | 10/2012 |
| EP | 2 65 288 A2 | 10/2013 |
| EP | 2654288 | 10/2013 |
| EP | 2654288 A2 | 10/2013 |
| JP | 2006211426 A | 8/2006 |
| JP | 2006-303961 | 11/2006 |
| JP | 2007053717 A | 2/2007 |
| JP | 2008283477 A | 11/2008 |
| JP | 2009-071592 | 4/2009 |
| JP | 2010062905 A | 3/2010 |
| JP | 2013-12822 | 1/2013 |
| KR | 10-2013-0116796 | 10/2013 |
| TW | 201300929 | 7/2009 |
| WO | 2009/080639 | 7/2009 |
| WO | 2011/033675 | 3/2011 |

OTHER PUBLICATIONS

Office Action and International Search Report in Taiwan application No. 1031135721, dated Oct. 2, 2015 (12 pages).
IPRP/ WO , PCT/US2014/057599, filed Sep. 29, 2014, dated Jun. 2, 2016, 10 pages.
Office Action, Taiwan Patent Application No. 103135721, dated May 9, 2016, 2 pages.
EPO Office Action, EP Application14 84572.1, dated Oct. 11, 2016, 6 pages.
Notice of Preliminary Rejection, KIPO, Korean Patent Application No. 10-2016-7013509, dated Feb. 10, 2017, 5 pages.
Communication, EPO, Application No. 14784572.1-1908, dated May 9, 2017, 5 pages.
Office Action, Japanese Patent Application No. 2016-530152, dated Jul. 18, 2017, 4 pages.
Summons to Oral Proceedings, EP Application No. 14784572.1-1908/3072290, Jan. 3, 2018, 7 pages.
https://www.magix.info/us/forum/convert-16-9-to-4-3-1038342/; Oct. 17, 2013 2:45 AM. Printed from Internet, 10 pages.
https://serato.com/forum/discussion/438221; Apr. 26, 2011, Printed from Internet, 3 pages.
Office Action, Chinese Patent Office, Chinese Application for Invention No. 201480059594.1, dated Feb. 28, 2018, 6 pages.
Extended European Search Report, EP Application 18208921.9, dated Jan. 24, 2019, 9 pages.
IP India, First Examination Report, Indian Application No. 201617010267, dated Dec. 27, 2018.
Official Action, Japan Patent Office, Japanese Patent Application No. 2017-228713, dated Jan. 7, 2019, 2 pages.

\* cited by examiner

MODELESS VIDEO AND STILL FRAME CAPTURE

This application is a continuation of U.S. patent application Ser. No. 15/414,866, filed on Jan. 25, 2017, which is a continuation of U.S. patent application Ser. No. 15/089,784, filed on Apr. 4, 2016 and now U.S. Pat. No. 9,591,219, which is a divisional of U.S. patent application Ser. No. 14/082,390, filed on Nov. 18, 2013 and now U.S. Pat. No. 9,344,626. The above applications are incorporated herein by reference in their entireties.

BACKGROUND

Technical Field

Embodiments disclosed herein are related to the field of video and still frame capture in portable electronic devices.

Description of the Related Art

Various portable electronic devices are designed to capture video and/or still frames (pictures). For example, such portable electronic devices may include hand-held video cameras, digital cameras, personal digital assistants equipped with image sensors ("cameras"), cell phones/smart phones equipped with cameras, tablets equipped with cameras, laptops equipped with cameras, etc.

Devices that support both video capture and still frame capture are becoming common, including the above devices. Such devices often permit the user to capture a still frame during a video capture. For example, the devices may display the video being captured on a screen that is included in the device or attached to the device, and the device may include a button or other user input device that the user can depress to capture the still frame. The "button" may be a physical button on the device, or a virtual button on the screen if the screen is a touch screen.

There are several issues with capturing a still frame during a video capture. First, the video capture is often performed at a lower resolution than the camera supports, and the higher resolution of the camera is typically used for the still frames captured when video is not being captured. Second, the aspect ratio of the video is typically 16×9 while still frames are typically captured with a 4×3 aspect ratio. Accordingly, when the user captures a still frame, the lower resolution and the different aspect ratio of the captured still frame can be surprising to the user and can be unsatisfying to the user. Generally, the camera sensor needs to be reconfigured when switching between high resolution still mode and lower resolution video mode, so one cannot simply switch modes to capture a higher resolution still image during video capture.

SUMMARY

In an embodiment, an electronic device may be configured to capture still frames during video capture but may capture the still frames in the 4×3 aspect ratio and at higher resolution than the 16×9 aspect ratio video frames. In one implementation, the device may interleave high resolution, 4×3 frames and lower resolution 16×9 frames in the video sequence, and may capture the nearest higher resolution, 4×3 frame when the user indicates the capture of a still frame. The device may display the video being captured on a display screen and may provide an indication of the 4×3 framing as well. For example, the video may be letterboxed with the remainder of the 4×3 framing shown in translucent form around the letterbox. In this manner, the user may be aware of the 4×3 framing and the video framing at the same time. In another implementation, the video being captured may be displayed on the display screen with the 16×9 aspect ratio. If user presses a shutter button to capture a still frame, the displayed video may be expanded to 4×3 aspect ratio (retaining the scale and placement of the video frame within the 4×3 frame). When the user releases the shutter button, the still may be captured and the display may return to the 16×9 aspect ratio.

BRIEF DESCRIPTION OF THE DRAWINGS

The following detailed description makes reference to the accompanying drawings, which are now briefly described.

Figure 1:
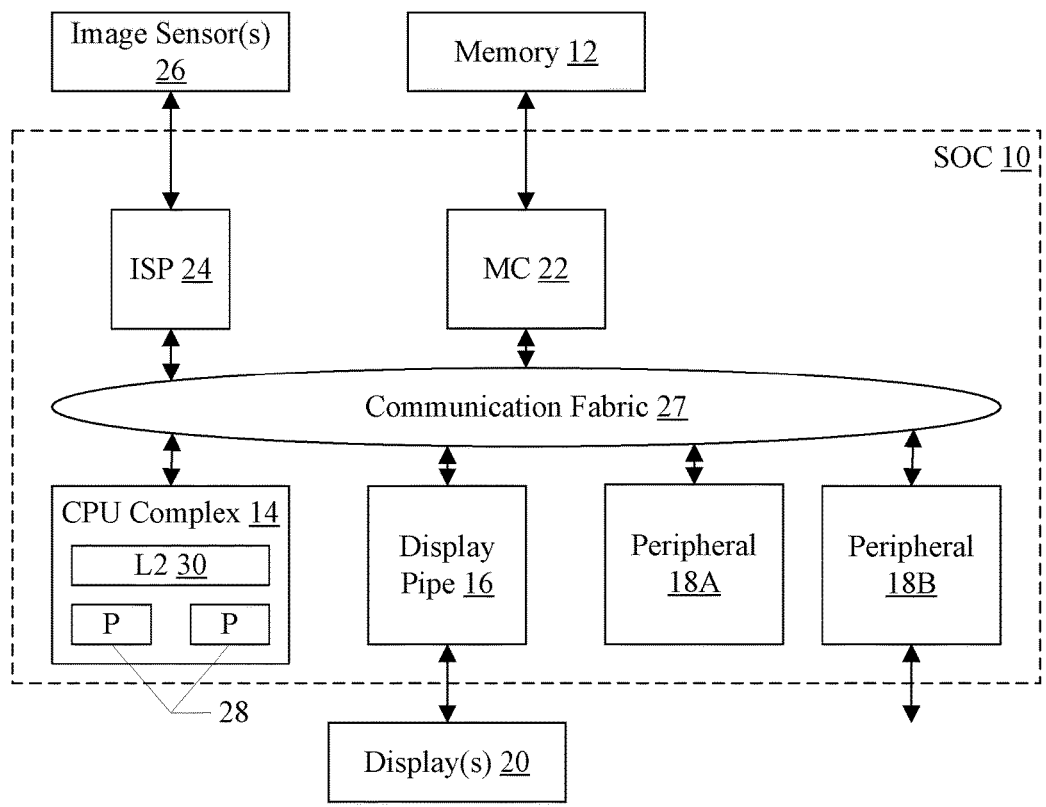
FIG. 1 is a block diagram of one embodiment of a system.

While the embodiments disclosed herein are susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph six interpretation for that unit/circuit/component.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

DETAILED DESCRIPTION OF EMBODIMENTS

Turning now to FIG. 1, a block diagram of one embodiment of a system on a chip (SOC) 10 is shown coupled to a memory 12, one or more image sensors 26, and one or more displays 20. As implied by the name, the components of the SOC 10 may be integrated onto a single semiconductor substrate as an integrated circuit "chip." In some embodiments, the components may be implemented on two or more discrete chips in a system. Additionally, various components may be integrated on any integrated circuit (i.e. it need not be an SOC). However, the SOC 10 will be used as an example herein. In the illustrated embodiment, the components of the SOC 10 include a central processing unit (CPU) complex 14, a display pipe 16, peripheral components 18A-18B (more briefly, "peripherals"), a memory controller 22, an image signal processor (ISP) 24, and a communication fabric 27. The components 14, 16, 18A-18B, 22, and 24 may all be coupled to the communication fabric 27. The memory controller 22 may be coupled to the memory 12 during use. Similarly, the ISP 24 may be coupled to the image sensors 26 during use and the display pipe 16 may be coupled to the displays 20 during use. Thus, the SOC 10, the image sensors 26, the memory 12, and the displays 20 may all be components of a system such as a portable electronic device (examples of which were mentioned above) or any other computer system. In the illustrated embodiment, the CPU complex 14 includes one or more processors 28 and a level two (L2) cache 30.

The ISP 24 may be configured to receive image sensor data from the image sensors 26 and may be configured to process the data to produce image frames that may be suitable, e.g., for display on a display 20 and/or other displays. The image frames may include still frames and video frames. The ISP 24 may be configured to write the image frames to the memory 12 (through the memory controller 22).

The image sensors 26 may generally include any device configured to sample light and provide an output representing the sampled light. The image sensors 26 may include cameras (e.g. charge coupled devices (CCDs), complementary metal-oxide-semiconductor (CMOS) sensors, etc.). The image sensors 26 may include various fixed or movable optical lenses as well, in some embodiments.

More particularly, in an embodiment, the ISP 24 may be configured to receive a series of frames over time from the image sensor 26 (e.g. at a specified frame rate, such as 60 frames per second (fps) although any frame rate may be used in various embodiments). The frames received from a given image sensor 26 may have a resolution and aspect ratio that is based on the maximum resolution of the given image sensor 26 and the aspect ratio of the given image sensor 26. For example, in an embodiment, the frames may be received at the maximum resolution and the aspect ratio of the given image sensor 26. In another embodiment, the frames may be received at a different aspect ratio than the given image sensor has, and the maximum resolution that may be supported at that different aspect ratio. For example, in an embodiment, the given image sensor 26 may have a 4×3 aspect ratio but the ISP 24 may receive frames in a 16×9 aspect ratio. The resolution of the received frames may be reduced from the maximum resolution to reflect the loss from 4×3 (16×12) to 16×9. Alternatively, the ISP 24 may be configured to reduce the aspect ratio on the received frames, in another embodiment.

In an embodiment, the ISP 24 may receive frames from more than one image sensor concurrently. For example, a video image sensor may be employed for lower resolution video capture along with a higher resolution still frame sensor. The ISP 24 may process data from the image sensors in an interleaved fashion. For example, the ISP 24 may capture and process a video image frame and may use the remainder of the time until the next video frame is captured to process the higher resolution still image frame (or a portion of the higher resolution frame).

The ISP 24 may be configured to process the received frames to produce a captured video sequence. The processing may include changing the resolution of at least some of the frames, as well as the aspect ratio, in an embodiment. In some embodiments, the frame rate may be changed as well. In one embodiment, the ISP 24 may interleave frames at the resolution and aspect ratio provided by the image sensor 26 with frames at a lower resolution and a different aspect ratio. For example, the lower resolution may be the resolution of a display standard to which the video sequence is being captured. The display standard may be any standard setting of resolution and aspect ratio which may be implemented by various displays. Since the resolution and aspect ratio is standard, it the video sequence may be suitable for display on many different types of display devices. For example, display standards may include 720p, 720i, 1080p, or 1080i. The 1080p standard is particularly popular presently, and is implemented by many video display devices such as televisions and computer monitors. These various display standards are also often referred to as high definition television (HDTV). The 1080p standard will be used as an example herein, and specifies a 16×9 aspect ratio and a resolution of 1920×1080, or 2 megapixels. On the other hand, the resolution of the image sensor 26 may be 8 megapixels, 10 megapixels, 12.5 megapixels, or more (or less, in an embodiment, but still higher than the 1080p resolution). The aspect ratio of the image sensor 26 may be 4×3 as well. Frames at the display standard resolution and aspect ratio may be referred to as display standard frames, or 1080p frames for a more specific example. Frames at the resolution and aspect ratio received from the image sensor 26 may be referred to as "full resolution" frames, even though in some cases the resolution may not be the maximum resolution of the image sensors 26.

By interleaving the 1080p frames and the full resolution frames in the video sequence, the ISP 24 may reduce the amount of bandwidth and power consumed when outputting the video sequence (e.g. by writing it to the memory 12 over the communication fabric 27 and through the memory controller 22). Additionally, the existence of the full resolution frames in the captured video sequence may permit the capture of a still frame while the video is being captured. The still frame may have the full resolution and aspect ratio of the image sensor 26 (by choosing one of the full resolution frames from the video sequence when the user indicates that a still is to be captured), which may provide a more desirable still (e.g. similar to those captured in still mode) without requiring a change of mode.

Interleaving the high resolution frames and the lower resolution frames may produce image streams of high resolution frames and lower resolution frames, each at half of the frame rate at which frames are captured from the image sensor 26. The frame rates need not be the same, however. For example, the high resolution frame rate may be ¼ of the frames in the stream, or ⅛ of the frames, or any other pattern of interleaving. The lower resolution frame rate may be increased to produce the desired total frame rate (e.g. the lower resolution frame may be ¾ of the frames if the high resolution frames are ¼ of the frames, or may be ⅞ of the frames if the high resolution frames are ⅛ of the frames).

In an embodiment, the ISP 24 may also generate a "preview" video sequence, which may be displayed by the display pipe 16 on the display 20. The preview video sequence may be a lower resolution sequence (e.g. the resolution may be similar to the 1080p resolution) but the aspect ratio may be the aspect ratio of the image sensor 26. That is, the aspect ratio may be the aspect ratio of still images. The preview sequence may be displayed for the user who is capturing the video, so the user may keep the video sequence framed as desired. Furthermore, displaying the still image aspect ratio may permit the user to view how the still image will be framed if a still image is captured. In an embodiment, the display standard aspect ratio may also be indicated in the preview sequence, so the user may see both the video frame and the still frame on the display 20 concurrently. In an embodiment, the frame rate of the preview video sequence may be lower than the frame rate of the captured video sequence as well (e.g. 30 fps as compared to 60 fbs).

Other embodiments may display the preview in other fashions. For example, the preview sequence may be generated at the display standard aspect ratio (e.g. 16×9) while video is being captured. The user may indicate a desire to capture a still (e.g. by depressing a shutter button on the device), and the preview may display the still aspect ratio around the video sequence (keeping the video sequence in its same position on the display 20, but displaying the remainder of the still frame as well). The video capture may continue while the shutter button is depressed. The user may release the shutter button to capture the still image and return to video-only capture. The shutter button may be a physical button included on the housing of the system, or may be a virtual button on the display screen (e.g. if the display 20 is a touch screen display).

The display pipe 16 may include hardware to process one or more static frames and/or one or more video sequences for display on the displays 20. Generally, for each source frame or video sequence, display pipe 16 may be configured to generate read memory operations to read the data representing the frame/video sequence from the memory 12 through the memory controller 22. In particular in this embodiment, the display pipe 16 may be configured to read the preview sequence from the memory 12 through the memory controller 22. Thus, the ISP 24 may write the preview sequence to the memory 12 as well as the captured sequence and any still frames. The display pipe 16 may be configured to perform any type of processing on the image data (static frames, video sequences, etc.). In one embodiment, the display pipe 16 may be configured to scale static frames and to dither, scale, and/or perform color space conversion on the frames of a video sequence. The display pipe 16 may be configured to blend the static frames and the video sequence frames to produce output frames for display. More generally, the display pipe 16 may be referred to as a display controller.

The displays 20 may be any sort of visual display devices. The displays may include, for example, touch screen style displays for mobile devices such as smart phones, tablets, etc. Various displays 20 may include liquid crystal display (LCD), light emitting diode (LED), plasma, cathode ray tube (CRT), etc. The displays may be integrated into a system including the SOC 10 (e.g. a smart phone or tablet) and/or may be a separately housed device such as a computer monitor, television, or other device.

Generally, the aspect ratio of the frame may refer to the ratio of pixels in the horizontal direction (as viewed by the user) to pixels in the vertical direction. The actual number of pixels in the frame may be referred to as the resolution of the frame. The more pixels in the frame, the finer grain the image may be and thus the more accurate the image may be.

The CPU complex 14 may include one or more CPU processors 28 that serve as the CPU of the SOC 10. The CPU of the system includes the processor(s) that execute the main control software of the system, such as an operating system. Generally, software executed by the CPU during use may control the other components of the system to realize the desired functionality of the system. The CPU processors 28 may also execute other software, such as application programs. The application programs may provide user functionality, and may rely on the operating system for lower level device control. Accordingly, the CPU processors 28 may also be referred to as application processors. The CPU complex may further include other hardware such as the L2 cache 30 and/or an interface to the other components of the system (e.g. an interface to the communication fabric 27).

The peripherals 18A-18B may be any set of additional hardware functionality included in the SOC 10. For example, the peripherals 18A-18B may include video peripherals such as video encoder/decoders, scalers, rotators, blenders, graphics processing units, etc. The peripherals may include audio peripherals such as microphones, speakers, interfaces to microphones and speakers, audio processors, digital signal processors, mixers, etc. The peripherals may include interface controllers for various interfaces external to the SOC 10 (e.g. the peripheral 18B) including interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included.

The memory controller 22 may generally include the circuitry for receiving memory requests from the other components of the SOC 10 and for accessing the memory 12 to complete the memory requests. The memory controller 22 may be configured to access any type of memory 12. For example, the memory 12 may be static random access memory (SRAM), dynamic RAM (DRAM) such as synchronous DRAM (SDRAM) including double data rate (DDR, DDR2, DDR3, etc.) DRAM. Low power/mobile versions of the DDR DRAM may be supported (e.g. LPDDR, mDDR, etc.).

The communication fabric 27 may be any communication interconnect and protocol for communicating among the components of the SOC 10. The communication fabric 27 may be bus-based, including shared bus configurations, cross bar configurations, and hierarchical buses with bridges. The communication fabric 27 may also be packet-based, and may be hierarchical with bridges, cross bar, point-to-point, or other interconnects.

It is noted that the number of components of the SOC 10 (and the number of subcomponents for those shown in FIG. 1, such as within the CPU complex 14) may vary from embodiment to embodiment. There may be more or fewer of each component/subcomponent than the number shown in FIG. 1.

Figure 2:
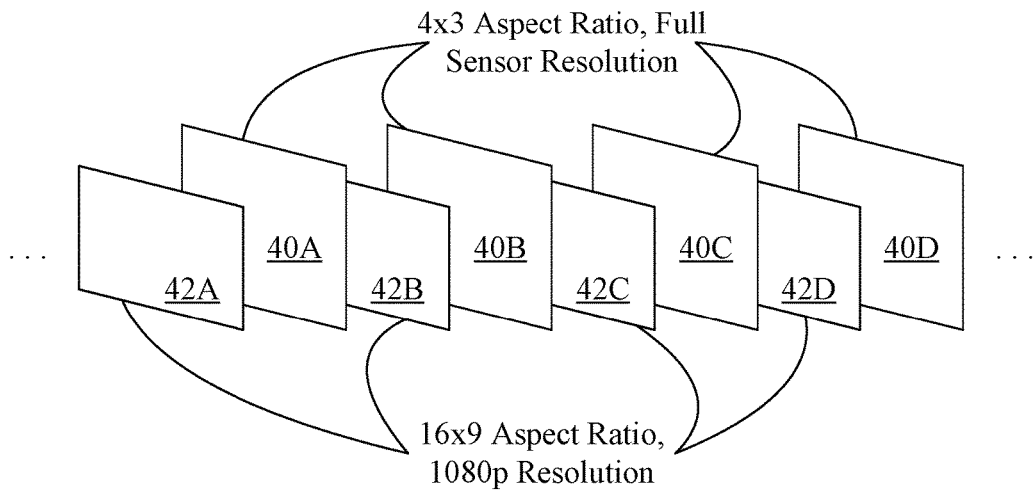
FIG. 2 is a block diagram illustrating frames captured over a period of time in one embodiment.

Turning next to FIG. 2, a diagram illustrating consecutive frames of a video sequence according to one embodiment is shown. The video sequence includes frames 40A-40D at the 4×3 aspect ratio and the full sensor resolution interleaved with frames 42A-42D at the 16×9 aspect ratio and the 1080p resolution. That is, alternating frames are provided at the 4×3 aspect ratio and high resolution, and at the 16×9 aspect ratio and the lower resolution. The frame rate of the video sequence may, in an embodiment, be the same as the input frame rate from the image sensor 26 (e.g. 60 fps). Accordingly, the effective frame rate of each frame type (full resolution and 1080p resolution) may be ½ of the video sequence frame rate (e.g. 30 fps).

As mentioned above, the frame rate for the full resolution and 1080p resolution frames need not be the same. Depending on various factors such as the available bandwidth in the system and in the ISP itself, the effective frame rates may be varied. For example, the full resolution frames may be captured at 15 fps and the 1080p resolution frames may be captured at 45 fps to yield 60 fps. Any set of frame rates may be used.

Figure 3:
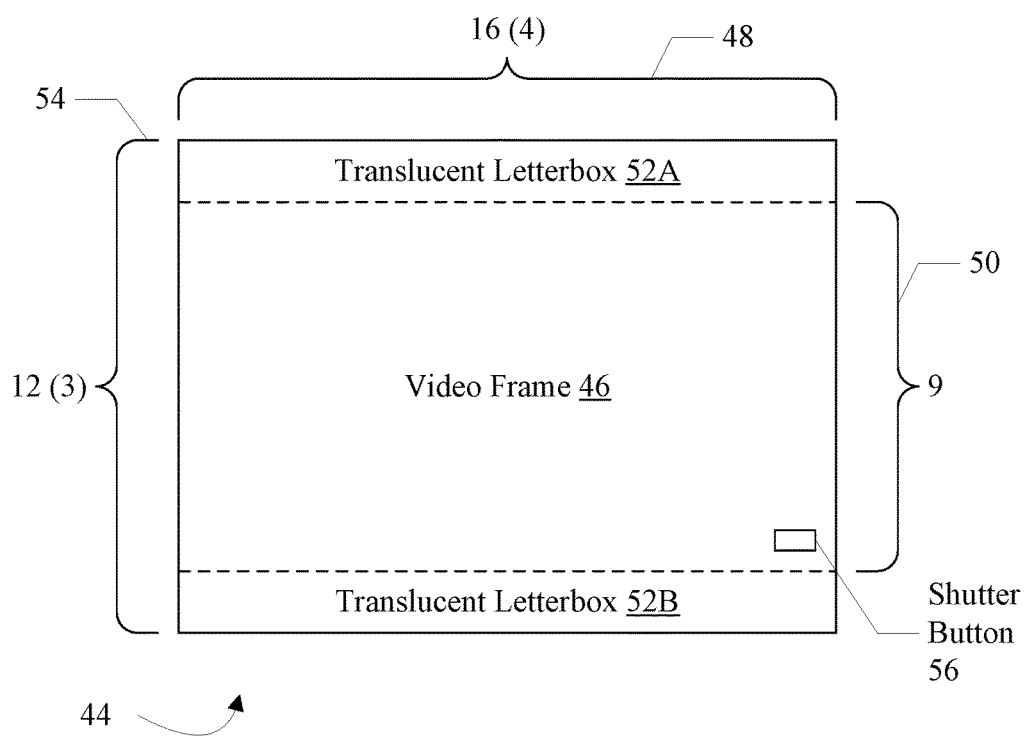
FIG. 3 is a block diagram of one embodiment of displaying frames on a display of the system shown in FIG. 1.

FIG. 3 is a block diagram illustrating one embodiment of a frame 44 of a preview sequence as may be displayed on the display 20 during capture of the video sequence shown in FIG. 2. The frame 44 may include the video frame 46, in 16×9 format as indicated by the braces 48 and 50. Additionally, the portions of the 4×3 (16×12) frame which extend beyond the video frame may be shown in translucent letterbox form 52A-52B, where the full 4×3 (16×12) frame is illustrated via braces 48 and 54.

The translucent letterboxes 52A-52B may be a visible indication of which part of the frame 44 is being captured in the video sequence (the video frame 46) and which portion is available for still image (the entire frame 44). The translucent letterboxes 52A-52B may shade the image to provide a visual effect, but may allow the underlying pixels to be viewed as well so that the user may frame the desired still shot while video is still being captured. Other embodiments may use other visual indicators (e.g. lines separating the video frame and still frame portions, tick marks on the right and left of the frame 44 at the points where the video frame 46 begins and ends, etc.).

The letterboxing effect may be added by the ISP 24 when processing the video sequence, or may be added through the display pipe 16, blending the transparent overlay as a static image onto the video sequence with a non-unitary alpha value that permits underlying pixel colors to be partially visible.

A virtual shutter button 56 is also displayed on the frame 44. In the illustrated embodiment, the button 56 is displayed within the video frame 44 but it may also be displayed in the letterbox areas 52A-52B. The button 56 may be used in embodiment in which the display 20 is a touch-enabled display. The user may depress the button 56 by making touch contact with the screen at a point at which the button is displayed to capture a still frame. In an embodiment, depressing button causes the still frame to be captured. In another embodiments, releasing the button after depressing it may cause the capture of the still frame. In the meantime, the video sequence may continued to be captured and displayed. In response to the user depressing (or releasing) the button 56, the SOC 10 may be configured to capture the nearest full resolution frame from the captured video sequence. That is, the point in time at which the still frame capture occurs may be synchronized to the video sequence and the nearest full resolution frame to that point in time may be selected.

Figure 4:
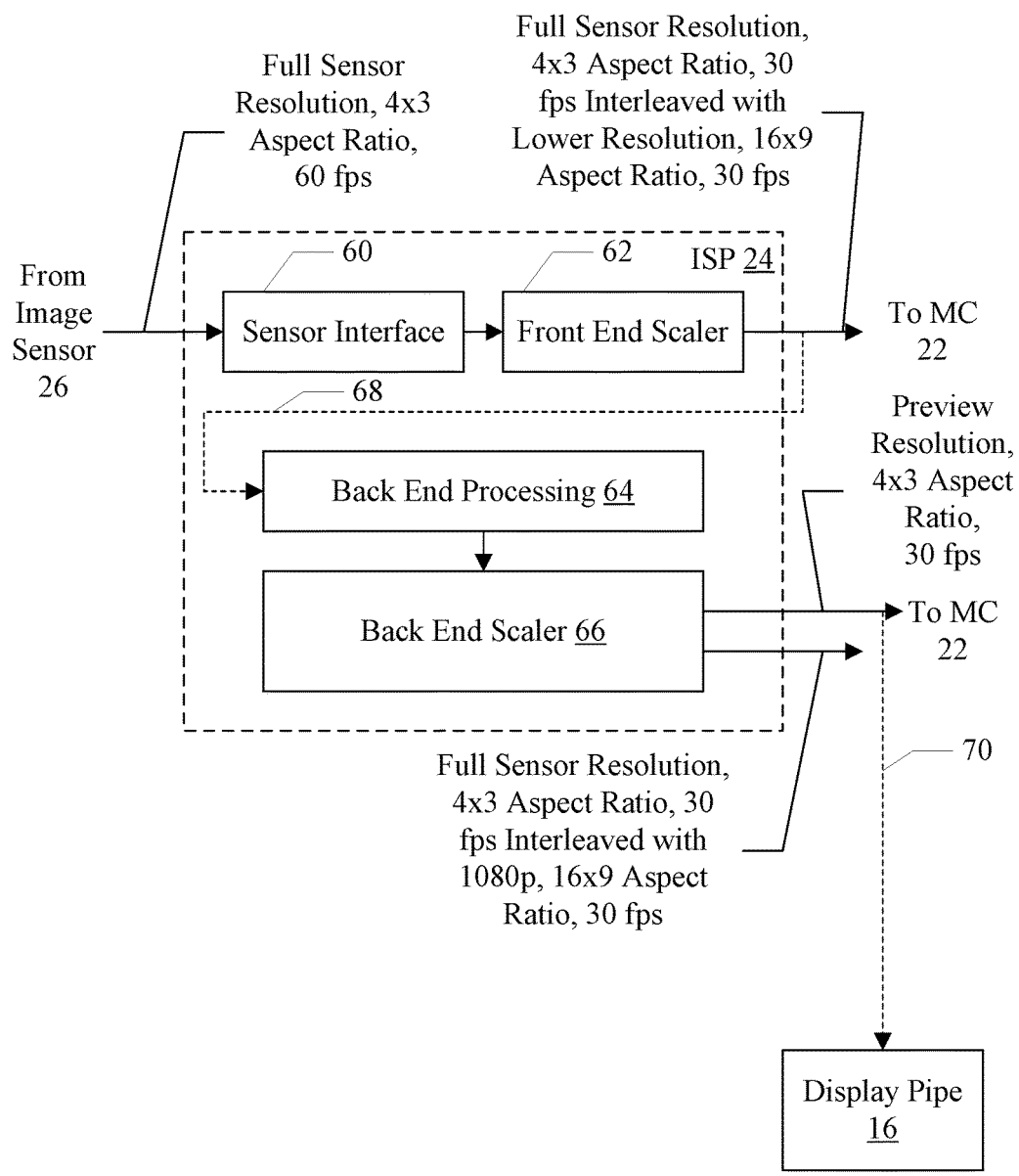
FIG. 4 is block diagram of one embodiment of an image signal processor (ISP) shown in FIG. 1.

Turning now to FIG. 4, a block diagram of one embodiment of the ISP 24 is shown. In the illustrated embodiment, the ISP 24 includes a sensor interface 60, a front end scaler 62, a back end processing block 64, and a back end scaler 66. The sensor interface 60 is coupled to receive frames from the image sensor(s) 26, and is coupled to the front end scaler 62. The front end scaler 62 is coupled to provide scaled frames to the memory controller 22 for storage in the memory 12. The back end processing block 64 is configured to read the scaled frames from memory 12 (illustrated by the dotted line 68 in FIG. 4). The back end processing block 64 is coupled to the back end scaler 66, which is coupled to provide a captured video sequence and a preview video sequence to the memory controller 22 for storage in the memory 12. The preview video sequence may be read from the memory 12 by the display pipe 16 (illustrated by the dotted line 70).

The frames received from the image sensor 26 may be full sensor resolution frames at a desired frame rate (e.g. 60 fps, in this example). Additionally, the frames may have the sensor aspect ratio (e.g. 4×3 in this example). As mentioned previously, in some embodiments, multiple image sensors may be employed and frames from each image sensor may be received. The frame rates for receiving images from each sensor need not be the same, in various embodiments. The sensor interface 60 may be configured to receive the frame data and supply the data to the front end scaler 62. The front end scaler 62 may output alternating frames at the full sensor resolution and aspect ratio (i.e. unmodified frames) and frames at a reduced resolution and a 16×9 aspect ratio. The reduced resolution may be the display standard resolution (e.g. 1080p) or may be an intermediate resolution. For example, the intermediate resolution may be based on the resolution of the preview video sequence. Specifically, the intermediate resolution may match the horizontal resolution of the preview video sequence, in an embodiment. In other embodiments, the relative rates at which high resolution frames and low resolution frames are generated may be varied, as discussed above.

The front end scaler 62 may be operating upon the raw sensor pixel data. The sensor pixel data may be provided in any format (e.g. Bayer format). The raw sensor pixel data may be converted to data that is used by the other components of the system (e.g. red-green-blue (RGB) pixels or Chrominance/luminance (YCrCb) pixels). The back end processing block 64 may be configured to perform the conversion, and the back end scaler 66 may be configured to scale the resulting frames. The back end scaler 66 may be configured to output two video streams to memory: the captured video sequence, which may include the interleaved 4×3, full sensor resolution frames interleaved with 1080p resolution, 16×9 frames; and the preview video sequence.

The preview video sequence need not be at the full frame rate of the captured video sequence. For example, in the illustrated embodiment, the preview video sequence may be 30 fps where the captured video sequence is 60 fps. Each preview frame may have a 4×3 aspect ratio, and may have a resolution suitable for the display 20. The previous frame may include the indication of the 16×9 frame within the 4×3 frame (e.g. the letterboxing), in an embodiment.

The back end processing block 64 may be configured to implement any other desired image processing or transformation mechanisms in addition to the Bayer pixel conversion mentioned above. For example, the back end processing block 64 may include noise insertion, color enhancement, etc.

Figure 5:
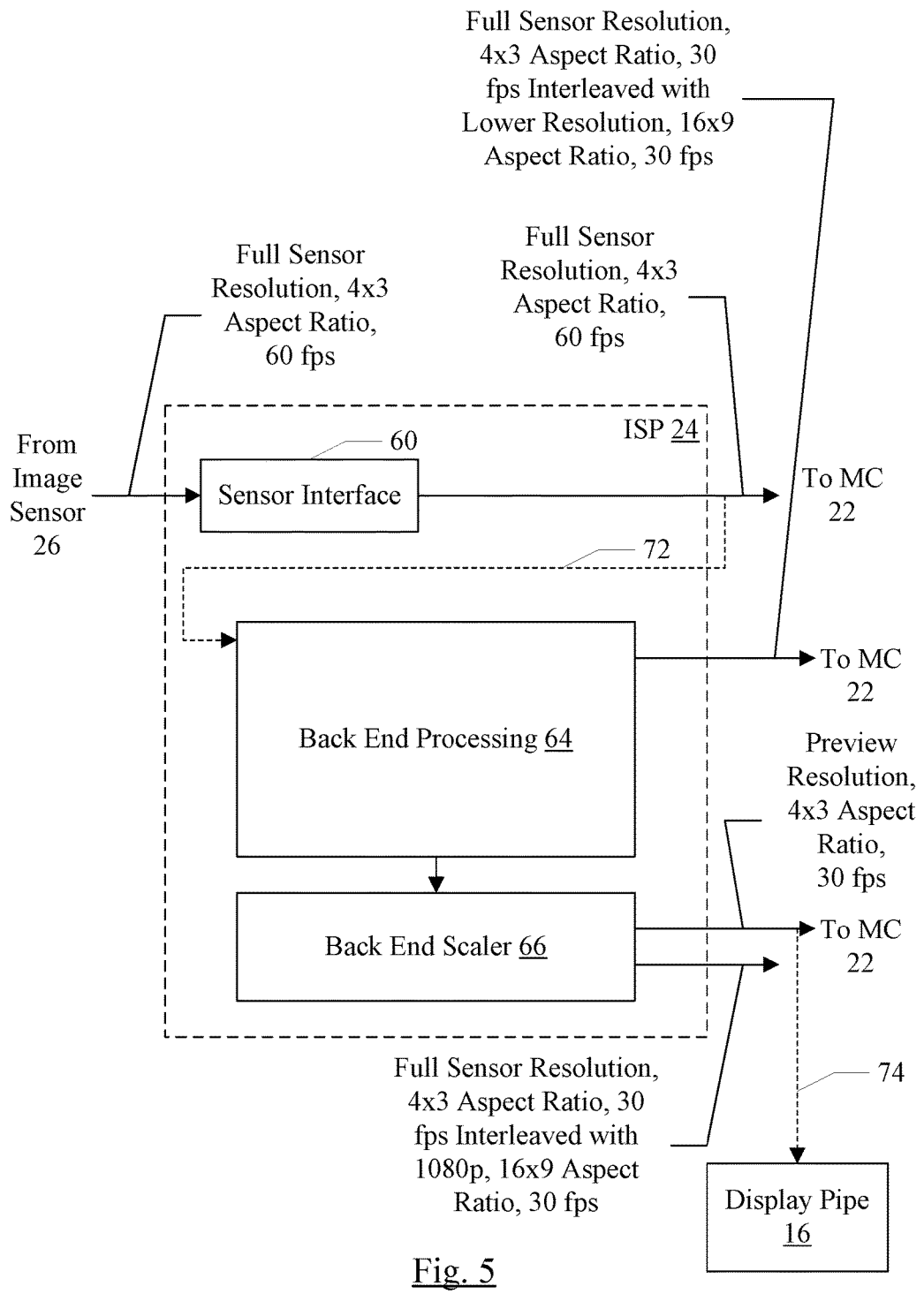
FIG. 5 is a block diagram of another embodiment of the ISP shown in FIG. 1.

FIG. 5 is a block diagram of another embodiment of the ISP 24. The embodiment of FIG. 5 does not include the front end scaler 62. Accordingly, the sensor interface 60 may be configured to receive the frames from the image sensor 26 and write the frames to memory. The received frames may have a 4×3 aspect ratio and the full sensor resolution, in the illustrated embodiment. Alternatively, the received frames may have the 16×9 aspect ratio, in another embodiment. The back end processing block 64 may read the received frames from memory (dotted line 72), and may generate the scaled video sequence interleaving the 4×3 aspect ratio, full sensor resolution frames and 16×9 aspect ratio, lower resolution frames that were generated by the front end scaler in the embodiment of FIG. 4. Furthermore, the back end processing block 64 may be configured to perform the Bayer to RGB/YCrCb processing and the like as described previously. The back end scaler 66 may be configured to generate the captured video sequence and the preview video sequence, as discussed previously with regard to FIG. 4. The display pipe 16 may read the preview video sequence from memory (dotted line 74) for display on the display 20.

Figure 6:
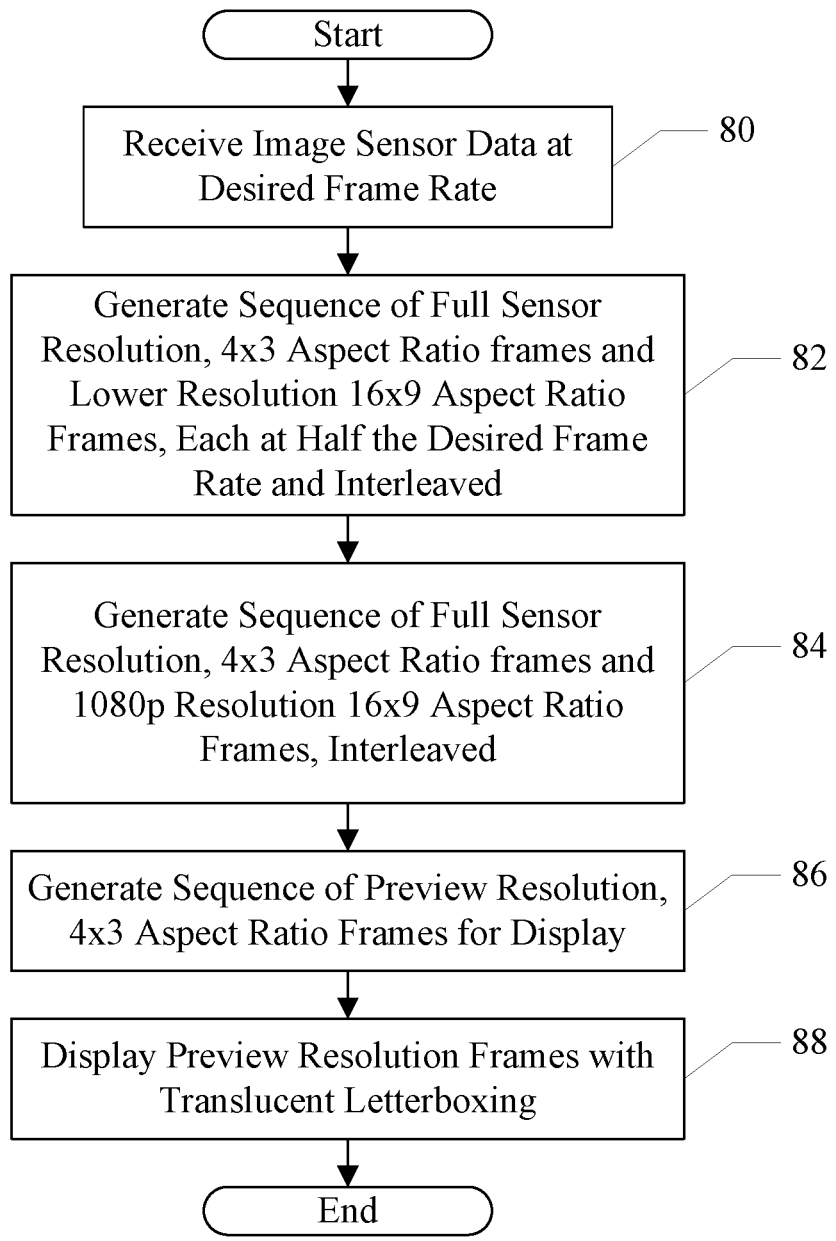
FIG. 6 is a flowchart illustrating video frame capture according to one embodiment of the system.

FIG. 6 is a flowchart illustrating operation of one embodiment of components of the SOC 10 for capturing the video sequence and the preview video sequence. While the blocks are shown in a particular order for ease of understanding, other orders may be used. Blocks may be performed in parallel in combinatorial logic in the components. Blocks may operate on different frames, or different portions of a frame, in parallel as well. Blocks, combinations of blocks, and/or the flowchart as a whole may be pipelined over multiple clock cycles. The components of the SOC 10 may be configured to implement the operation shown in FIG. 6.

The ISP 24 may be configured to receive the image sensor data at the desired frame rate (block 80). The ISP 24 may be configured to generate the sequence of interleaved frames (full sensor resolution, 4×3 aspect ratio frames and lower resolution, 16×9 aspect ratio frames). The sequences of frames of each type may effectively have half the frame rate of the received frames, and thus the interleaved sequence may have the same frame rate as the received frames (block 82). Alternatively, different frames rates for the low resolution frames and the high resolution frames may be supported, as discussed previously. The ISP 24 may be configured to generate the captured video sequence, which includes the full sensor, 4×3 aspect ratio frames interleaved with 1080p frames (block 84). Additionally, the ISP 24 may be configured to generate the preview resolution, 4×3 aspect ratio frames of the preview video sequence (block 86). In one embodiment, the frame rate of the preview video sequence is less than that of the captured video sequence. For example, the frame rate may be half of the captured video sequence. Frames of the preview video sequence may be generated, e.g., by merging a 4×3 frame (scaled to 1080p resolution) and an adjacent 16×9 frame from the captured video sequence. The display pipe 16 may display the preview video sequence with translucent letterboxing to indicate the video (16×9) portion of the frame (block 88). The translucent letterboxing effect may be part of the backend scaler 66 providing the preview video sequence, or may be applied via blending of the preview video sequence and a static letterbox image. The captured video sequence and the preview video sequence may be stored in separate memory regions in the memory 12. Since the preview video sequence is provided for the user to view while the sequence is being captured, its region may be somewhat smaller if desired and older frames in the video sequence may be overwritten by newer frames. Conversely, the captured video sequence may be intended for retention (e.g. for later processing/viewing, perhaps offloading to another device, etc.). Accordingly, a larger region may be allocated for the captured video sequence. In some embodiments, the captured video sequence may be transferred to other storage (e.g. non-volatile memory in the system, not shown).

If different frame rates are used for the high resolution frames and the low resolution frames, the generation of high resolution frames may be performed in slices between generation of the lower resolution frames. For example, if low resolution frames are being captured at 30 fps, the ISP 24 may capture a low resolution frame in less than ⅟30 of a second. The remaining time until the expiration of the ⅟30 of a second may be used to process a high resolution slice. The slice may be a tile, or multiple tiles of the high resolution frame, for example.

Figure 7:
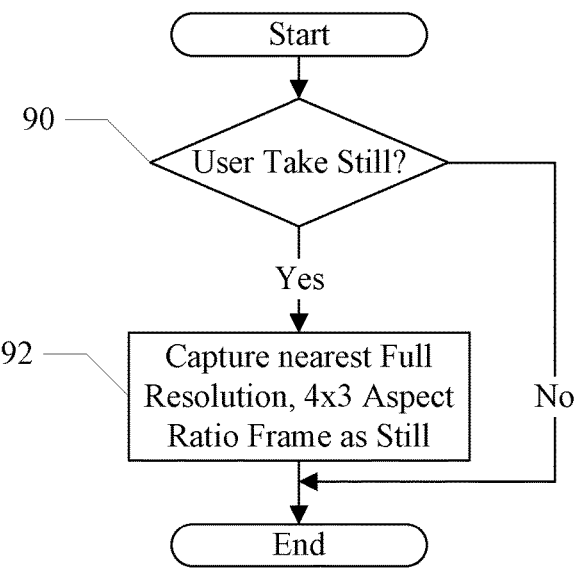
FIG. 7 is a flowchart illustrating still frame capture according to one embodiment of the system.

FIG. 7 is a flowchart illustrating operation of one embodiment of components of the SOC 10 for capturing a still frame during video capture. While the blocks are shown in a particular order for ease of understanding, other orders may be used. Blocks may be performed in parallel in combinatorial logic in the components. Blocks, combinations of blocks, and/or the flowchart as a whole may be pipelined over multiple clock cycles. The components of the SOC 10 may be configured to implement the operation shown in FIG. 7.

The user may indicate to the system that a still frame is to be captured (decision block 90). For example, the user may press a physical shutter button on the system, or a virtual shutter button displayed on the display 20 (which may be a touch screen display in this embodiment). The detection of the button press or other indication may be performed by one of the processors 28, e.g. in response to an interrupt from the device (display 20 or the physical button). If the user has indicated a still (decision block 90, "yes" leg), the system may capture the nearest 4×3 aspect ratio, full sensor resolution frame from the captured video sequence (block 92). The system may determine the nearest frame by, for example, comparing a timestamp of the button press event or other indication event to timestamps of the captured video sequence frames. The still frame may be copied from its location in the captured video in the memory 12 to another location for storage as a still.

In some embodiments, the system may employ image quality filtering to select a still image to capture, rather than strictly capturing the nearest high resolution frame. For example, the frames may be checked for sharpness, and a sharper image that is farther away in time from the button press may be preferred over a nearer image. If the subject of the picture is a human, a frame in which the subject's eyes are open may be preferred over a nearer frame. Any sort of image quality filtering may be included in various embodiments.

In another embodiment, the preview video sequence may be displayed at the 16×9 resolution during video capture. If, during video capture, the user indicates that a still is to be captured, the preview video sequence may be expanded to the 4×3 aspect ratio so the user may observe the framing of the still. The video capture may continue during this time, capturing at the 16×9 aspect ratio. Once the still is captured, the preview video sequence may transition back to the 16×9 aspect ratio. Displaying only the 16×9 video frames when a still capture is not being performed may further reduce bandwidth and power consumption for the video data, while still providing the desired aspect ratio for stills, in an embodiment.

Figure 8:
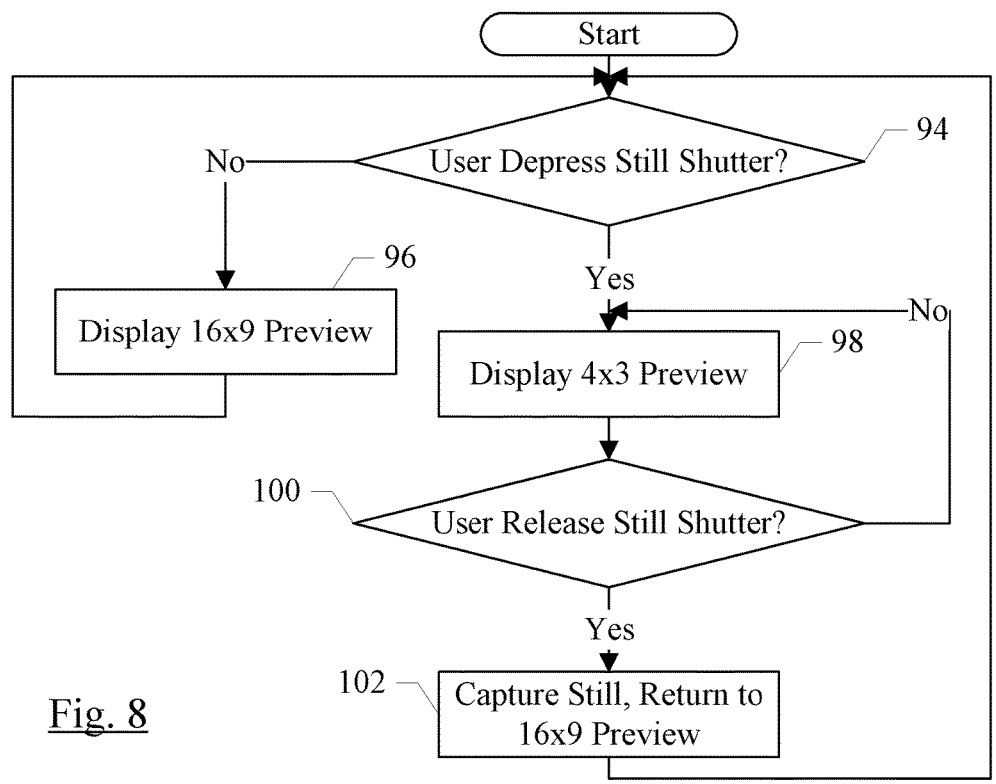
FIG. 8 is a flowchart illustrating still frame capture according to another embodiment of the system.

FIG. 8 is a flowchart illustrating operation of one embodiment of the system to implement the transition from 16×9 to 4×3 and back. While the blocks are shown in a particular order for ease of understanding, other orders may be used. Blocks may be performed in parallel in combinatorial logic in the components. Blocks, combinations of blocks, and/or the flowchart as a whole may be pipelined over multiple clock cycles. The components of the SOC 10 may be configured to implement the operation shown in FIG. 8.

The system may be in video capture mode, capturing video frames and displaying a 16×9 preview on the display 20. The user may indicate that a still frame is desired, e.g., by pressing a physical or virtual shutter button (decision block 94). As discussed above, the user depressing the button may be detected, e.g., by a processor 28 receiving an interrupt. If the user does not depress the shutter button (decision block 94, "no" leg), the system may continue displaying the 16×9 preview frames (block 96). On the other hand, if the user depresses the shutter button (decision block 94, "yes" leg), the system may display a 4×3 preview (block 98) and may continue displaying the 4×3 preview until the user releases the shutter button (decision block 100, "no" leg). The user may thus frame the still while the button is depressed, if desired.

The transition from 16×9 to 4×3 may be performed in a variety of fashions. For example, the 4×3 frame may fade in, retaining the 16×9 frame in its same position and scale within the 4×3 frame. The portion of the 4×3 frame outside of the 16×9 frame may be translucently letter boxed so that both the video framing and the still framing may be visible concurrently. Alternatively, the fade in may not reach full brightness, providing a visual distinction between the video framing and the still framing.

Once the user releases the shutter button (decision block 100, "yes" leg), the system may capture the still in a memory location separate from the video sequence and the display may return to displaying the 16×9 video frame (block 102). For example, the 4×3 frame may fade out. During the framing and capture of the still frame (e.g. while the shutter button is pressed), the video capture may continue to occur.

It is noted that, while the discussion above uses 16×9 as the video aspect ratio and 4×3 as the still aspect ratio, other embodiments may employ other aspect ratios for one or both of the video frames and still frames.

Similar to the discussion above with regard to FIG. 7, the still frame captured in the embodiment of FIG. 8 may be a frame that is near, in time, to the button release but may also employ image quality filtering.

Figure 9:
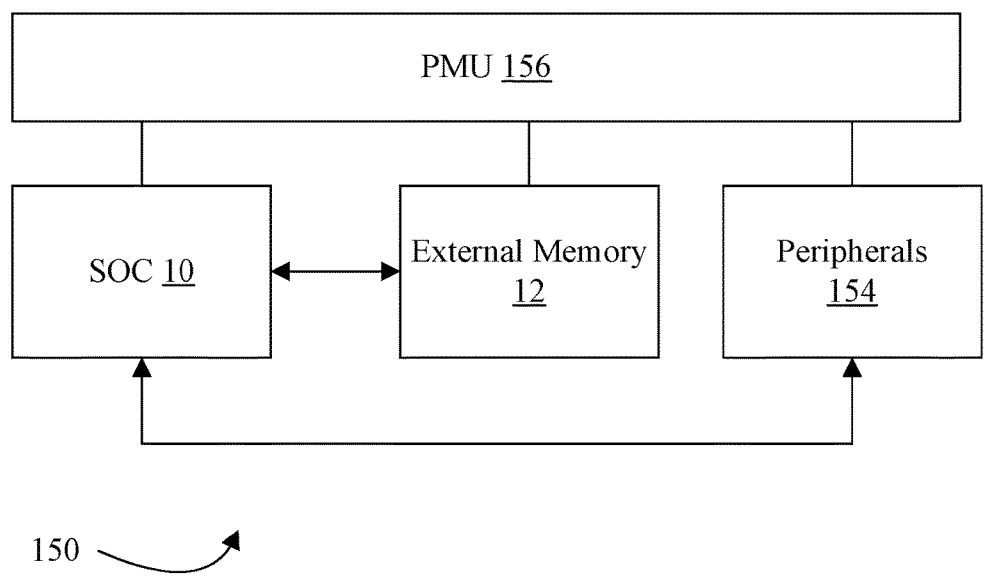
FIG. 9 is a block diagram of another embodiment of the system.

Turning next to FIG. 9, a block diagram of one embodiment of a system 150 is shown. In the illustrated embodiment, the system 150 includes at least one instance of the SOC 10 coupled to one or more peripherals 154 and the external memory 12. A power supply 156 is provided which supplies the supply voltages to the SOC 10 as well as one or more supply voltages to the memory 12 and/or the peripherals 154. In some embodiments, more than one instance of the SOC 10 may be included (and more than one memory 12 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as wifi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.). Specifically, the peripherals 154 may include the image sensor(s) 26 and the displays 20 shown in FIG. 1.

The external memory 12 may include any type of memory. For example, the external memory 12 may be SRAM, dynamic RAM (DRAM) such as synchronous DRAM (SDRAM), double data rate (DDR, DDR2, DDR3, etc.) SDRAM, RAMBUS DRAM, etc. The external memory 12 may include one or more memory modules to which the memory devices are mounted, such as single inline memory modules (SIMMs), dual inline memory modules (DIMMs), etc. Alternatively, the external memory 12 may include one or more memory devices that are mounted on the SOC 10 in a chip-on-chip or package-on-package implementation Numerous variations and modifications will become apparent to those skilled in the art once the above disclosure is fully appreciated. It is intended that the following claims be interpreted to embrace all such variations and modifications.

What is claimed is:

1. A device comprising:
   at least one image sensor;
   a display device; and
   an integrated circuit coupled to the image sensor and the display device, wherein:
   the integrated circuit is configured to receive a first plurality of frames from the image sensor;
   the integrated circuit is configured to output a first video sequence based on the first plurality of frames;
   the first video sequence includes a second plurality frames having a first aspect ratio associated with still frames and a first resolution, and the first video sequence further includes a third plurality of frames having a second aspect ratio different from the first aspect ratio;
   the integrated circuit is configured to output a second video sequence, based on the first plurality of frames, to be displayed on the display device;
   the second video sequence includes a fourth plurality of frames at a second resolution that is less than the first resolution;
   the integrated circuit is configured to capture a first frame of the second plurality of frames responsive to a user input on the device; and
   the first frame is nearest in time in the first video sequence to a second frame of the second video sequence that is displayed on the display device at a time that the user input is received.

2. The device as recited in claim 1 wherein the second aspect ratio is associated with video frames.

3. The device as recited in claim 2 wherein the second aspect ratio is specified by a video display standard.

4. The device as recited in claim 2 wherein the first aspect ratio is 4×3 and the second aspect ratio is 16×9.

5. The device as recited in claim 1 wherein the integrated circuit is configured to interleave the second plurality of frames and the third plurality of frames in the first video sequence.

6. The device as recited in claim 1 wherein the first resolution is provided by the image sensor and the third plurality of frames have a third resolution less than the first resolution.

7. The device as recited in claim 6 wherein the third resolution is greater than the second resolution.

8. The device as recited in claim 6 wherein the third resolution is specified by a display standard.

9. In a device including an image sensor, a display device, and an integrated circuit coupled to the image sensor and the display device, a method comprising:
   receiving, in the integrated circuit, a first plurality of frames from the image sensor;
   outputting, from the integrated circuit a first video sequence based on the first plurality of frames, wherein the first video sequence includes a second plurality frames having a first aspect ratio associated with still frames and a first resolution, and wherein the first video sequence further includes a third plurality of frames having a second aspect ratio different from the first aspect ratio;
   displaying a second video sequence on the display device, the second video sequence based on the first plurality of frames and including a fourth plurality of frames at a second resolution that is less than the first resolution;
   receiving user input on the device during a time that a first frame of the fourth plurality of frames is displayed on the display device; and
   capturing, by the integrated circuit, a second frame of the second plurality of frames responsive to the user input, wherein the second frame is nearest in time in the first video sequence to the second frame.

10. The method as recited in claim 9 wherein the second aspect ratio is associated with video frames.

11. The method as recited in claim 10 wherein the second aspect ratio is specified by a video display standard.

12. The method as recited in claim 10 wherein the first aspect ratio is 4×3 and the second aspect ratio is 16×9.

13. The method as recited in claim 9 further comprising interleaving, by the integrated circuit, the second plurality of frames and the third plurality of frames in the first video sequence.

14. The method as recited in claim 9 wherein the first resolution is provided by the image sensor and the third plurality of frames have a third resolution less than the first resolution.

15. The method as recited in claim 14 wherein the third resolution is greater than the second resolution.

16. The method as recited in claim 14 wherein the third resolution is specified by a display standard.

17. An integrated circuit comprising:
   a memory controller coupled to a memory during use;
   a display controller coupled to the memory controller and coupled to a display during use; and
   an image signal processor (ISP) coupled to the memory controller and having a sensor interface configured to receive a first plurality of frames from an image sensor, wherein:
      the ISP is configured to output a first video sequence based on the first plurality of frames to the memory controller to store in the memory;
      the first video sequence includes a second plurality frames having a first aspect ratio associated with still frames and a first resolution, and the first video sequence further includes a third plurality of frames having a second aspect ratio different from the first aspect ratio;
      the ISP is configured to output a second video sequence, based on the first plurality of frames, to be displayed on the display device;
      the second video sequence includes a fourth plurality of frames at a second resolution that is less than the first resolution;
      the integrated circuit is configured to capture a first frame of the second plurality of frames responsive to a user input on the device; and
      the first frame is nearest in time in the first video sequence to a second frame of the second video sequence that is displayed on the display device at a time that the user input is received.

18. The integrated circuit as recited in claim 17 wherein the ISP is configured to interleave the second plurality of frames and the third plurality of frames in the first video sequence.

19. The integrated circuit as recited in claim 17 wherein the first resolution is provided by the image sensor and the third plurality of frames have a third resolution less than the first resolution.

20. The integrated circuit as recited in claim 19 wherein the third resolution is greater than the second resolution.

* * * * *